United States Patent
Han et al.

(10) Patent No.: US 10,399,659 B2
(45) Date of Patent: Sep. 3, 2019

(54) DOOR FOR CLOSING OPENING IN STRUCTURE AND AIRCRAFT

(71) Applicants: AIRBUS (S.A.S.), Cedex (FR); Airbus Operations S.L., Madrid (ES)

(72) Inventors: Zengli Han, Beijing (CN); Haifeng Chen, Beijing (CN); Ming Luo, Beijing (CN); Angel Postigo-Rodriguez, Madrid (ES); Daniel De-La-Sen-Perez, Madrid (ES); Laure Partouche, Madrid (FR)

(73) Assignees: AIRBUS (S.A.S.), Blagnac (FR); AIRBUS OPERATIONS S.L., Madrid (ES)

( * ) Notice: Subject to any disclaimer, the term of this patent is extended or adjusted under 35 U.S.C. 154(b) by 63 days.

(21) Appl. No.: 14/977,121

(22) Filed: Dec. 21, 2015

(65) Prior Publication Data

US 2016/0176496 A1 Jun. 23, 2016

(30) Foreign Application Priority Data

Dec. 22, 2014 (CN) .......................... 2014 1 0803516

(51) Int. Cl.
*B64C 1/14* (2006.01)
*E06B 3/04* (2006.01)
(Continued)

(52) U.S. Cl.
CPC .............. *B64C 1/1446* (2013.01); *B64C 3/34* (2013.01); *E05C 3/124* (2013.01); *E06B 3/04* (2013.01)

(58) Field of Classification Search
CPC .......... B64C 1/1446; B64C 3/34; B64C 1/14; B64C 1/1407; E05C 3/124; E02D 29/1427; E02D 29/14; B64D 29/08; E06B 3/04
See application file for complete search history.

(56) References Cited

U.S. PATENT DOCUMENTS 2,316,507 A * 4/1943 Dykeman .......... B60K 15/0406
  114/201 R
5,339,491 A * 8/1994 Sims ................... B60R 16/0215
  16/2.2
(Continued)

FOREIGN PATENT DOCUMENTS

CN 2197428 5/1995
CN 2273332 1/1998
(Continued)

OTHER PUBLICATIONS

Extended European Search Report for EP 15 20 1684 dated Apr. 19, 2016.
(Continued)

*Primary Examiner* — Valentina Xavier
(74) *Attorney, Agent, or Firm* — Nixon & Vanderhye P.C.

(57) ABSTRACT

The present invention relates to a door for closing an opening in a structure, including: a body arranged to be capable of abutting against a first side of the opening; at least one clamping member configured to be capable of abutting against an opposite second side of the opening; and a fastener arranged to fasten or release the clamping member relative to the body. The clamping member is moveable relative to the body between a first position where the clamping member abuts against the second side of the opening so as to clamp the structure between the body and the clamping member and a second position where the clamping member allows the door to be opened. The present invention further relates to an aircraft including the above door.

17 Claims, 9 Drawing Sheets

(51) Int. Cl.
*E05C 3/12* (2006.01)
*B64C 3/34* (2006.01)

(56) References Cited

U.S. PATENT DOCUMENTS

| | | | |
|---|---|---|---|
| 5,628,152 A | 5/1997 | Bowman | |
| 5,901,502 A * | 5/1999 | Rafalski | F24F 13/02 49/463 |
| 7,017,891 B2 * | 3/2006 | Izabel | B60S 1/0416 267/141.4 |
| 7,347,070 B1 * | 3/2008 | Spector | B65D 55/14 404/25 |
| 2002/0007655 A1 * | 1/2002 | Calle | E05C 19/003 70/101 |
| 2008/0260460 A1 * | 10/2008 | Nolle | E02D 29/1427 404/25 |
| 2010/0243809 A1 * | 9/2010 | Noble | B64C 1/1446 244/129.4 |
| 2013/0306796 A1 | 11/2013 | Alazraki | |
| 2014/0123561 A1 * | 5/2014 | Chwala | E05B 35/008 49/465 |
| 2016/0201371 A1 * | 7/2016 | Harding | B64C 1/14 244/129.4 |
| 2017/0001705 A1 * | 1/2017 | Rufino | B64C 1/1446 |
| 2017/0021909 A1 * | 1/2017 | Neal | B64C 1/1446 |

FOREIGN PATENT DOCUMENTS

| | | |
|---|---|---|
| CN | 1193366 | 9/1998 |
| EP | 2664547 A1 | 11/2013 |

OTHER PUBLICATIONS

Chinese Office Action for Application No. CN 201410803516.X, 15 pages, dated Apr. 2, 2019, and English language translation of the Office Action.

* cited by examiner

DOOR FOR CLOSING OPENING IN STRUCTURE AND AIRCRAFT

RELATED APPLICATION

The present application claims priority from Chinese Application No. 201410803516.X, filed Dec. 22, 2014. The disclosures of which is hereby incorporated by reference herein in its entirety.

FIELD OF THE INVENTION

The present invention relates to a door for closing an opening in a structure and an aircraft.

BACKGROUND OF THE INVENTION

The contents in this section only provide background information relating to the disclosure, and does not necessarily constitute the prior art.

An access opening is normally arranged in an aircraft for inspecting or maintaining an internal structure of the aircraft. This access opening is generally closed by an access door. In one known configuration, an access door is fastened to a skin of an aircraft by bolts or screws, thereby inevitably forming apertures in the skin, which is possible to destroy integrity and strength of the skin. Moreover, after the access door is mounted or demounted for a number of times, the apertures in the skin may be deformed, and therefore the access door cannot be firmly held.

SUMMARY OF THE INVENTION

One object of the present invention is to provide a door capable of closing an opening in a structure without damage to the structure itself.

Another object of the present invention is to provide a door capable of closing the opening in the structure rapidly and easily.

Still another object of the present invention is to provide a door capable of closing the opening in the structure and being adapted to tolerances of the structure.

One or more of the above objects may be achieved by the following solution. A door for closing an opening in a structure includes: a body arranged to be capable of abutting against a first side of the opening: at least one clamping member configured to be capable of abutting against an opposite second side of the opening; a fastener arranged to fasten or release the clamping member relative to the body; wherein the clamping member is moveable relative to the body between a first position where the clamping member abuts against the second side of the opening so as to clamp the structure between the body and the clamping member and a second position where the clamping member allows the door to be opened.

In the above solution, since the door may be fastened to the opening in a clamping manner (i.e., the body of the door abuts against the first side of the opening and the clamping member on the door abuts against the second side of the opening), the door according to the present invention is capable of being mounted and demounted quickly and easily. Furthermore, since the clamping member is fastened to the body of the door by the fastener, an aperture for receiving the fastener is not required to be formed in the structure, thus maintaining the integrity of the structure.

Further, the clamping member may be configured to be a slider arranged on a slider engagement portion of the body, and the fastener is arranged to fasten or release the slider relative to the slider engagement portion. The slider is slidable relative to the slide engagement portion between a first position where the slider abuts against the second side of the opening so as to lock the door to the opening and a second position where the slider retracts to allow the door to be opened.

In the above solution, since the clamping member is configured to be in a form of a slider, it is possible to mount and demount the door more quickly and easily, and provide better reliability.

Preferably, in the first position, the slider is fastened to the slider engagement portion by the fastener. Thus, the slider is capable of holding the door on the structure reliably via the fastener.

Preferably, in the second position, the slider is held on the slider engagement portion in a slidable manner by the fastener. Thus, the slider can be previously held on the body by the fastener. In this way, when the opening is desired to be closed with the door, the slider may slide from the second position to the first position rapidly and easily and be fastened in place by fasteners.

Preferably, the fastener includes a nut member arranged on the body and a bolt member arranged to be capable of passing through a through hole in the slider and being screwed into the nut member; or the fastener includes a bolt member arranged on the body and capable of passing through a through hole in the slider and a nut member arranged on the side of the slider and capable of being screwed on the bolt member. Although other types of fasteners may be adopted, using bolts and nuts as standard parts can obtain better universality, lower cost and better assembly performance. Herein, it is to be appreciated that, the nut member may be a separate nut, or may be the one integrated with the body or a part of the body. In addition, it may be appreciated that, the bolt member or the nut member may be fastened by a tool such as a wrench, or may be formed thereon with a torque amplifying portion, so as to be fastened by a hand of an operator.

Preferably, the through hole in the slider is an elongated hole extending along a sliding direction of the slider. Although other types of holes may be adopted, the elongated hole can provide the slider with a predetermined sliding range and guidance performance.

Preferably, a resilient member is arranged between the slider and the body to pull the slider back to the second position. In one specific example, the resilient member may be a spring. Thus, in the demounting of the door, the slider may be automatically pulled back to the second position by the resilient member when the fastener is loosened; thereby removing the door quickly.

Preferably, the slider is provided thereon with a groove or a protrusion, and the slider engagement portion is provided thereon with a protrusion or a groove corresponding to the groove or the protrusion of the slider. By adopting a combination of the groove and the protrusion, the sliding of the slider on the slide engaging portion can be guided more stably.

Preferably, the groove in the slider or the slider engagement portion is a dovetail groove. Adopting the dovetail groove may further prevent disengagement of the slider from the slider engagement portion, and further increase convenience and safety.

Preferably, the body is connected to the structure via a connecting member. The connecting member may be, for example, a cable. Thus, after being demounted, the door may still be connected to the structure by the connecting member, thus preventing the door from being lost or falling.

Preferably, a sealing member is arranged between the body and the structure. The sealing member may effectively isolate the inside from the outside of the structure. This is particularly advantageous in the field of aircraft.

Preferably, the body is substantially a quadrangle with rounded corners. More preferably, the body is a square in shape, or a square with rounded corners in shape. Thus, though the door is larger than the opening in the structure, the inside or outside of the structure may be accessed through the opening by rotating the door by a certain angle.

Preferably, four sides of the body are each provided with the slider. Thus, the door may be more reliably held on the structure.

Preferably, the body of the door is provided thereon with a breakable feature. More preferably, the breakable feature is a groove formed in the body. This is particularly advantageous in the field of aircraft. For example, when the pressure difference across the door reaches a predetermined value, the door will be automatically broken due to these breakable features so as to maintain pressure equilibrium across the structure.

Preferably, the structure is a skin of an aircraft. The door according to the present invention can be applied not only in an aircraft, for example for closing the access opening in the aircraft skin; but also in other applications where an opening is required to be opened or closed rapidly.

Preferably, the slider is provided thereon with a first inclined surface, and the slider engagement portion is provided thereon with a corresponding second inclined surface, so that the slider obliquely slides relative to the slider engagement portion by means of the first inclined surface and the second inclined surface. The configuration of inclined surfaces being adopted between the slider and the slider engagement portion is advantageous in that: on the one hand, it may be adapted to tolerances of the structure, for example, when the thickness of the structure is larger or smaller, the sliding of the slider in the direction of the inclination may automatically compensate for such manufacturing tolerances of the structure; and on the other hand, when the fastener is screwed, a fastening force of the fastener may be transmitted via these inclined surfaces to the surface of the slider in contact with the structure, so as to provide an appropriate clamping force between the door and the structure.

Preferably, an angle between the first inclined surface or the second inclined surface and a plane on which the body is located ranges from 10 degrees to 30 degrees. Herein, the inclination angle of the inclined surfaces and/or the length of the elongated hole in the slider may be appropriately determined according to predetermined values of manufacturing tolerances of the structure.

Preferably, the clamping member is configured to be rotatable between the first position and the second position. By adopting the above configuration, the configuration of the door can be further simplified and manufacturing costs of the door can be further lowered.

Another aspect of the present invention further relates to an aircraft including the above door.

BRIEF DESCRIPTION OF THE DRAWINGS

Features and advantages of one or more embodiments of the present invention can be understood more readily from the following description made with reference to the drawings in which.

DETAILED DESCRIPTION

Figure 1:
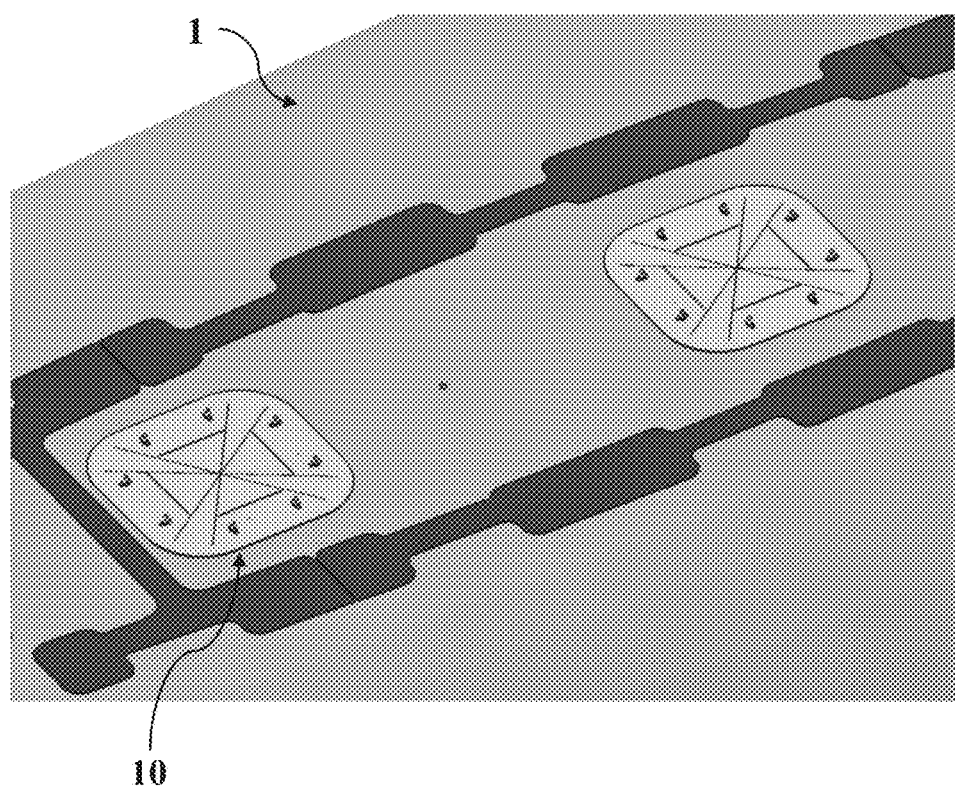
FIG. 1 is a schematic view of an application of a door according to an embodiment of the present invention.

The following description of the preferred embodiments is only illustrative rather than limiting to the present invention and application or usage thereof. Throughout the drawings, the like reference numerals are used to indicate the like elements and thus the description of configurations of the like elements will not be repeated.

The configuration and application of the door (or an access door) according to the present invention are described in detail hereinafter with reference to FIGS. 1 to 10.

FIG. 1 shows an application of the door according to an embodiment of the present invention, taking an aircraft as an example. In FIG. 1, an opening or an access opening is formed in a skin 1 (which is an example of the structure), and a door 10 according to the embodiment of the present invention is provided for closing the opening in the skin 1. Herein, it is to be understood by the person skilled in the art that, the door according to the present invention can be applied not only in aircrafts, but also in structures such as vehicles, vessels and containers.

The general idea of the present invention is to provide a door for closing an opening in a structure. The door may include: a body arranged to be capable of abutting against a first side of the opening; at least one clamping member configured to be capable of abutting against an opposite second side of the opening; a fastener arranged to fasten or release the clamping member with respect to the body. The clamping member is moveable with respect to the body between a first position where the clamping member abuts against the second side of the opening so as to clamp the structure between the body and the clamping member and a second position where the clamping member allows the door to be opened.

Figure 2:
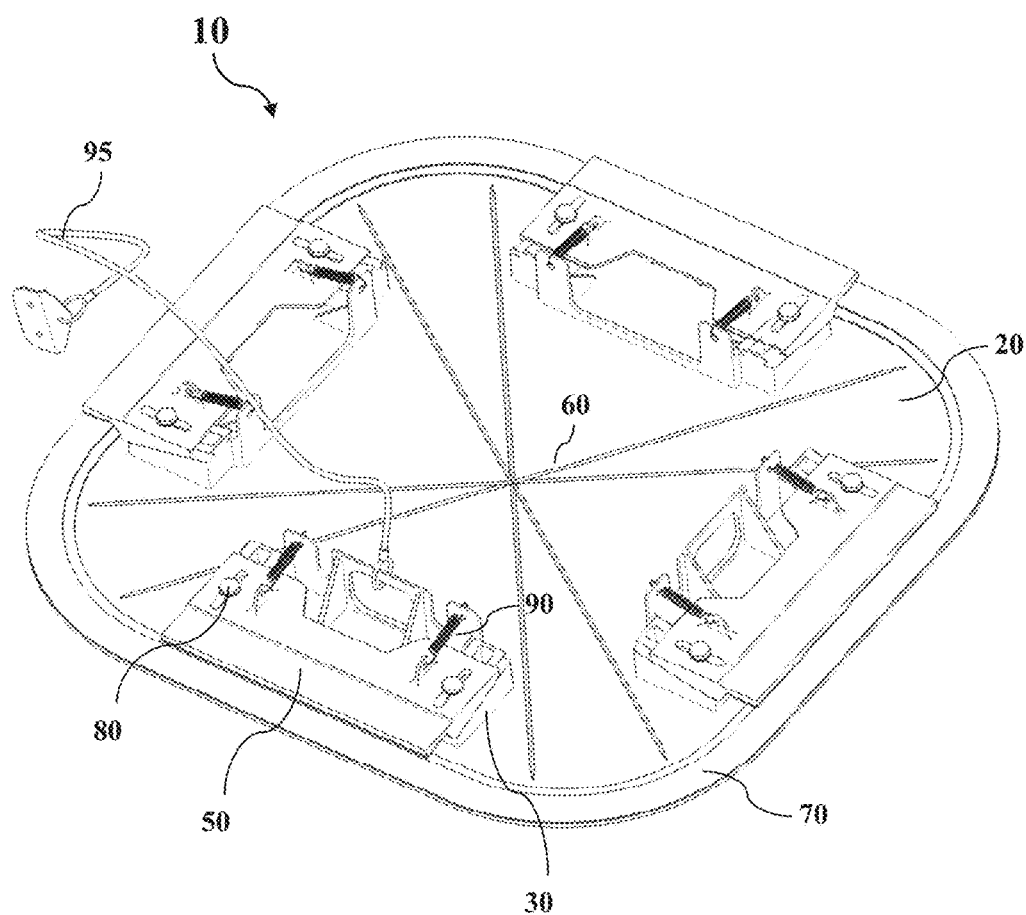
FIG. 2 is a perspective view of the door according to the embodiment of the present invention.
Figure 3:
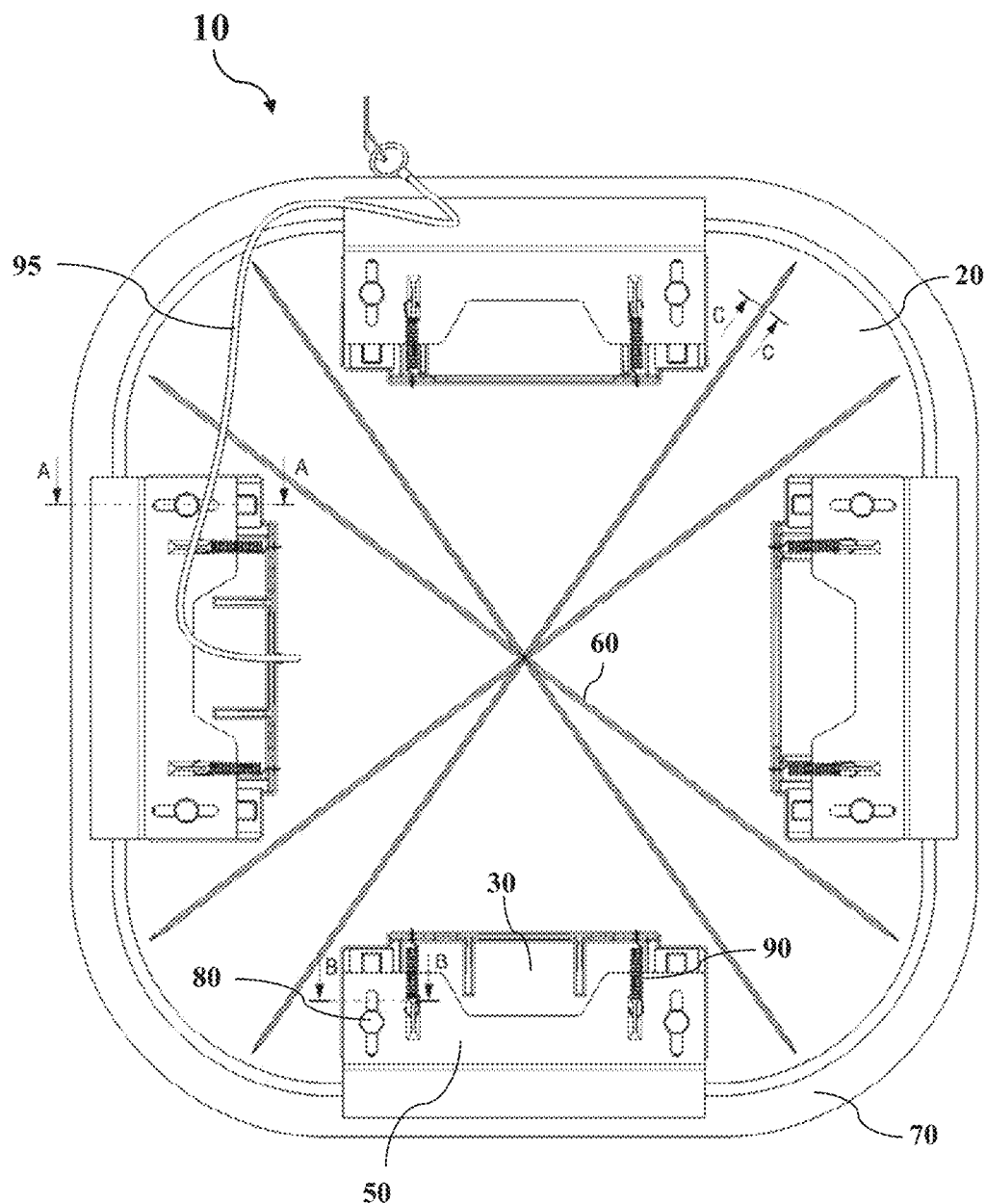
FIG. 3 is a front view of the door according to the embodiment of the present invention.
Figure 4:
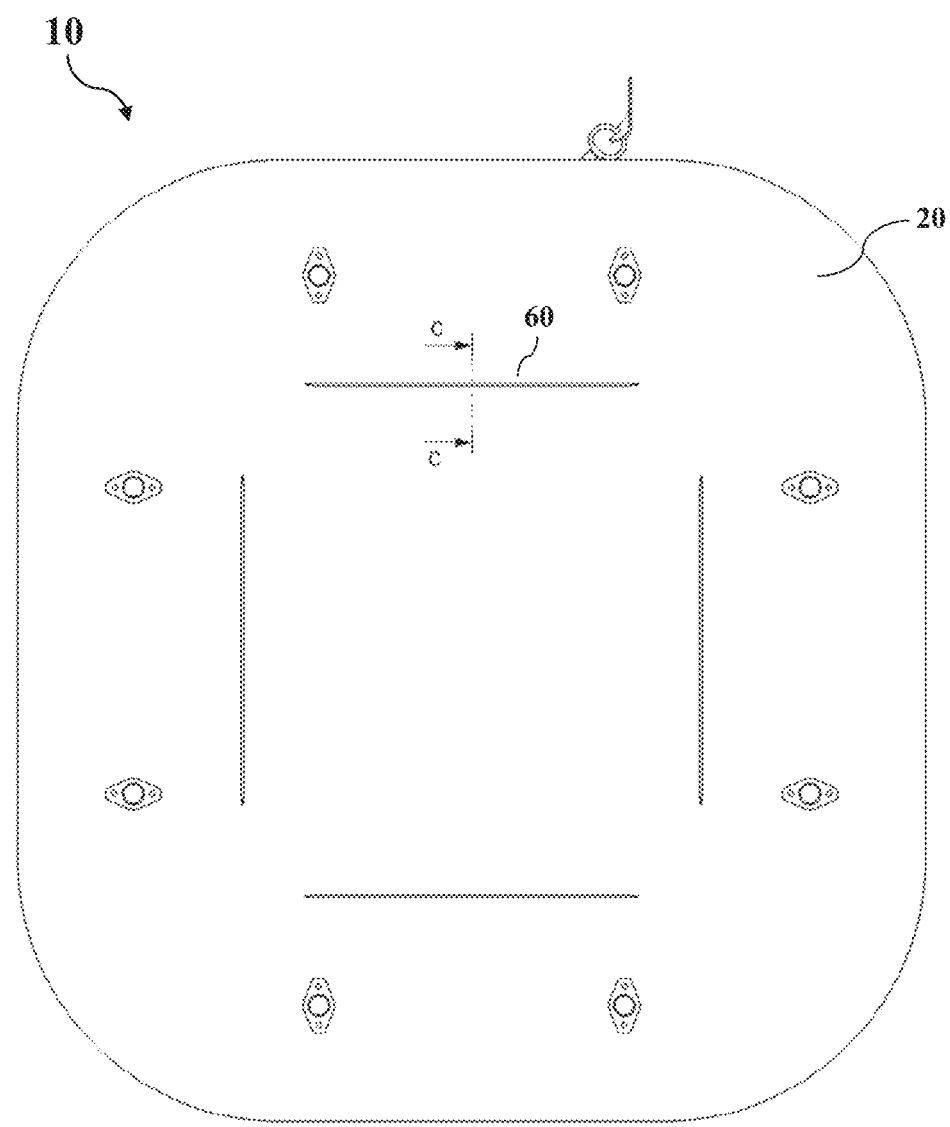
FIG. 4 is a rear view of a door according to another embodiment of the present invention.

As a particular example for achieving the above clamping member, FIGS. 2 to 10 disclose an example in which the clamping member is implemented as a slidable slider 50. More specifically, as shown in FIGS. 2 to 10, the door 10 for closing an opening 2 (see FIG. 5) in a structure (e.g., in the skin 1 of an aircraft) according to one embodiment of the invention may include a body 20. The body 20 may have a substantially quadrangular shape with rounded corners, more preferably a square shape with rounded corners. However, it is to be appreciated by those skilled in the art that, the body 20 may have any shape corresponding to that of the opening in the structure. The body 20 may be arranged to be capable of abutting against a first side 3 of the opening 2 so as to close the opening 2. The body 20 may further be provided thereon with at least one slider engagement portion 30. In the case that the body 20 is in a square shape with rounded corners as shown in FIG. 2, four sides of the body 20 may be each provided thereon with one slider engagement portion 30. The door 20 further includes a slider 50 arranged on the slider engagement portion 30. A fastener 80 may be arranged between the slider 50 and the slider engagement portion 30 so as to allow the slider 50 to be fastened or released with respect to the slider engagement portion 30 via the fastener 80. The slider 50 is configured to be slidable with respect to the slider engagement portion 30 between a first position and a second position. In the first position, the slider 50 may abut against the opposite second side 4 of the opening 2 so as to lock the door 10 to the opening 2 (i.e., the structure 1 around the opening 2 is sandwiched between the body 20 of the door 10 and the slider 50), and in the second position, the slider 50 may be retracted to allow the door 10 to be opened.

In the example as shown, the fastener 80 may include a nut member 82 arranged on the body 20 and a bolt member 84 arranged to be capable of passing through a through hole 52 in the slider 50 and being screwed into the nut member 82. Herein, it is to be appreciated by those skilled in the art that, the nut member 82 may he a separate nut, and may also be the one integrated with the body 20 or a part of the body 20. For example, it may be appreciated by those skilled in the art that, the fastener 80 may also be arranged to include a bolt member arranged on the body 20 and capable of passing through a through hole 52 in the slider 50, and a nut member arranged on the side of the slider 50 and capable of being screwed on the bolt member, Furthermore, the bolt member or the nut member may be arranged to be fastened by a tool such as a wrench, and may further be formed thereon with a torque amplifying portion (for example, lugs or a large diameter portion), so as to be fastened by a hand of an operator. As shown better in FIGS. 9 and 10, the through hole 52 in the slider 50 may be an elongated hole 52 extending along the sliding direction of the slider.

Since the fastener 80 is arranged to extend through the slider 50 and/or the body 20 of the door 10 (it is to be particularly pointed out that the fastener 80 does not pass through the structural 1 having the opening 2) to fasten or release the slider 50, therefore an aperture is not required to be formed in the structure 1 such as the skin, so as not to destroy the integrity and strength of structure 1.

Figure 5:
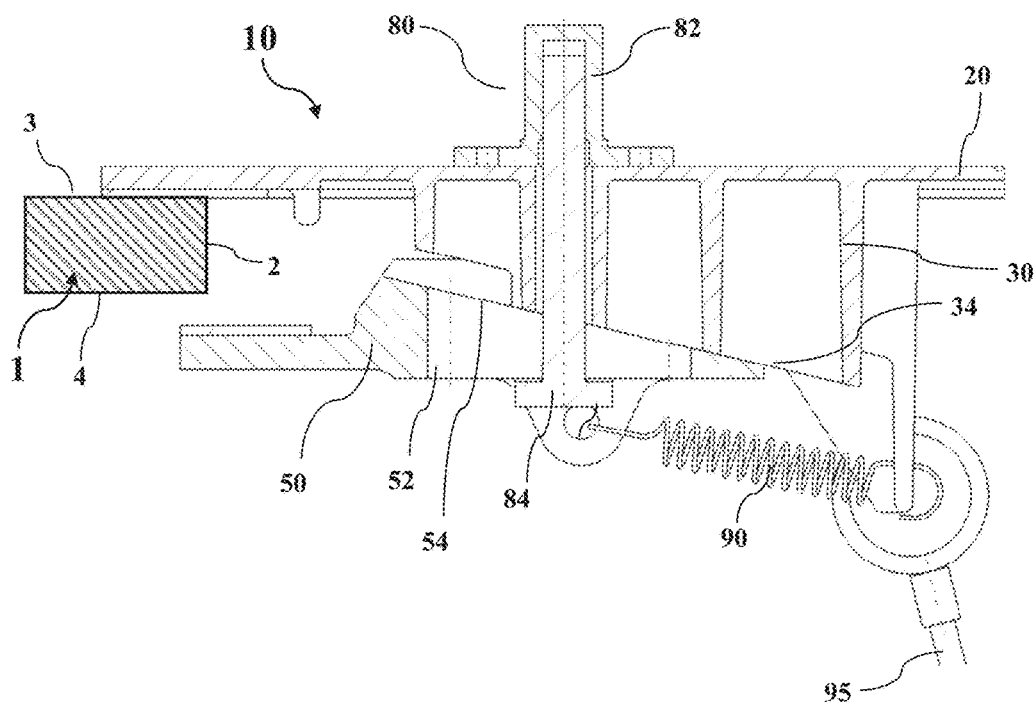
FIG. 5 is a sectional view taken along line A-A in FIG. 3.
Figure 6:
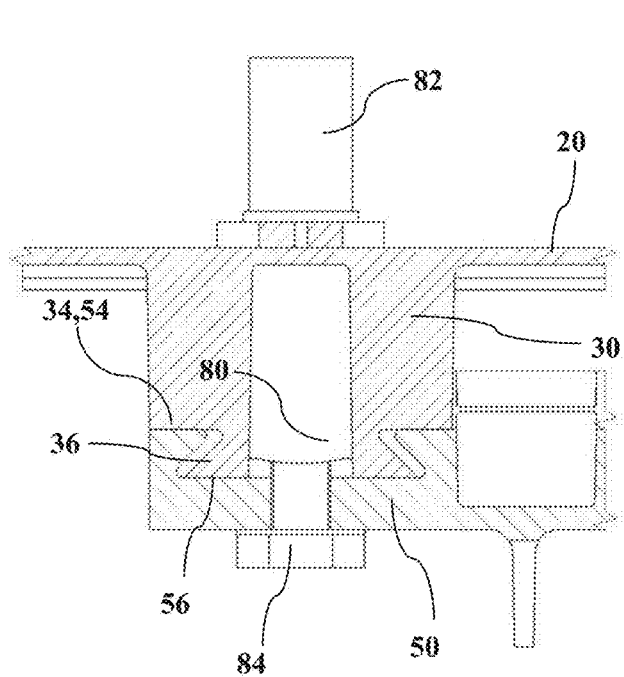
FIG. 6 is a sectional view taken along line B-B in FIG. 3.

In a preferred example, as shown in FIG. 5, a first inclined surface 54 may further be arranged on the slider 50. Correspondingly, a second inclined surface 34 may be arranged on the slider engagement portion 30. Thus, the slider 50 can slide obliquely with respect to the slider engagement portion 30 by means of the first inclined surface 54 and the second inclined surface 34. The configuration of inclined surfaces being adopted between the slider 50 and the slider engagement portion 30 is advantageous in that: on the one hand, it may be adapted to tolerances of the structure 1, for example, when the thickness of the structure 1 is larger or smaller, the sliding of the slider 50 in the direction of the inclination may automatically compensate for such manufacturing tolerances of the structure 1; on the other hand, when tightening the bolt member 84, a fastening force of the head of the bolt member 84 acting on the slider 50 will urge the slider 50 to slide along the inclined surfaces, such that a clamping force is applied to the portion of the structure 1 in contact with the slider 50, thereby securely holding the door 10 on the opening 2. An angle between the first inclined surface 54 or the second inclined surface 34 and the plane on which the body 20 is located may be ranged from 10 degrees to 30 degrees. Herein, the inclination angle of the inclined surfaces and/or the length of the elongated hole 52 in the slider 50 can be appropriately determined according to predetermined values of the manufacturing tolerances of the structure 1.

It is to be appreciated by those skilled in the art, when there is no need for adaptation to manufacturing tolerances of the structure, the inclined surfaces may not be provided, that is, the inclination angle of the above inclined surfaces may be set to 0 degree.

Further preferably, as shown in FIGS. 6 and 8 to 10, a groove 56 may be arranged in the slider 50, and a protrusion 36 corresponding to the groove 56 in the slider 50 may be arranged on the slider engagement portion 30. Alternatively, a protrusion may be arranged on the slider 50, while a groove corresponding to the protrusion on the slider 50 may be arranged in the slider engagement portion 30. By using a combination of the groove and the protrusion between the slider 50 and the slider engagement portion 30, the sliding of the slider 50 on the slider engagement portion 30 can be more stably guided. Preferably, the groove in the slider 50 or the slider engagement portion 30 is a dovetail groove. Adopting the dovetail groove may further prevent disengagement of the slider from the slider engagement portion, and further increase convenience and safety.

In the example as shown, two sets of grooves and protrusions are arranged between each slider 50 and the corresponding slider engagement portion 30. However, it is to be understood by those skilled in the art that, only one set of groove and protrusion may be arranged between each slider 50 and the corresponding slider engagement portion 30, which may also perform similar guiding and disengagement-preventing function. In addition, it is to be appreciated by those skilled in the art that, the sliding connection between the slider 50 and the slider engagement portion 30 may also be implemented in other manners, for example, by rail assembly or the like.

Preferably, a resilient member 90 may be arranged between the slider 50 and the body 20 to pull the slider 50 back to the second position. In one specific example, the resilient member 90 may be a spring. Thus, when demounting the door 10, the slider 50 may be automatically pulled back into the second position by the resilient member 90 when the fastener 80 is loosened. The door can therefore be quickly removed.

Preferably, the body 20 may be connected to the structure 1 via a connecting member 95. The connecting member 95 may be, for example, a cable. Thus, the door may still be connected to the structure by the connecting member even after being demounted, thus being prevented from being lost or falling.

Preferably, a sealing member 70 may be arranged between the body 20 and the structure 1 so as to effectively isolate the inside from the outside of the structure.

Figure 7:
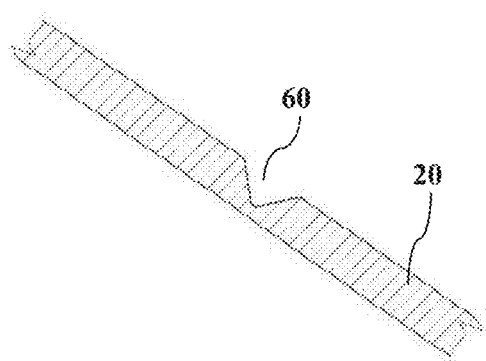
FIG. 7 is a sectional view taken along line C-C in FIG. 3.
Figure 8:
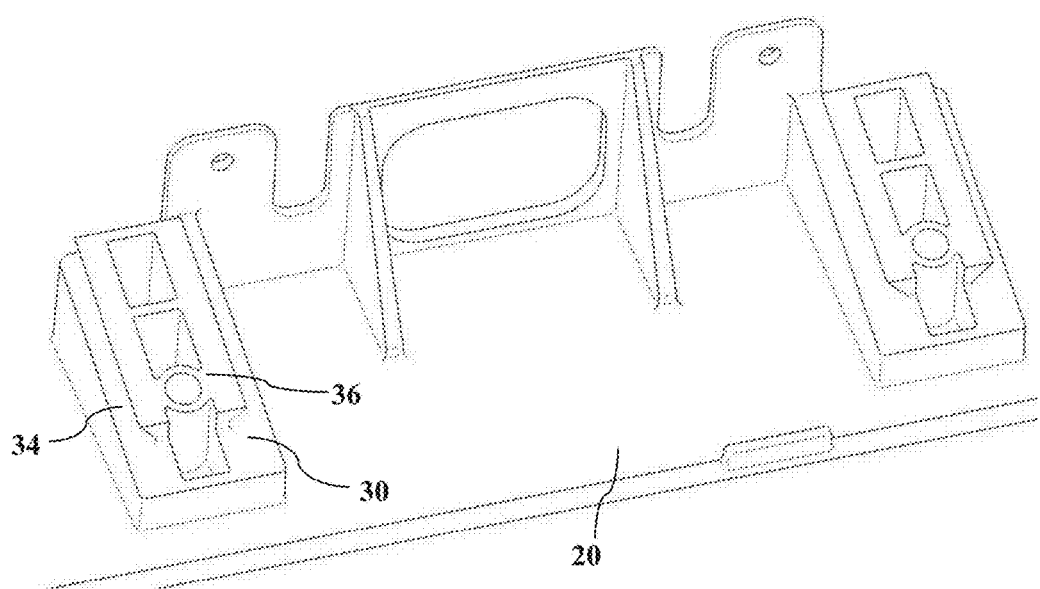
FIG. 8 is a partially enlarged view of a body of the door according to the embodiment of the present invention.
Figure 9:
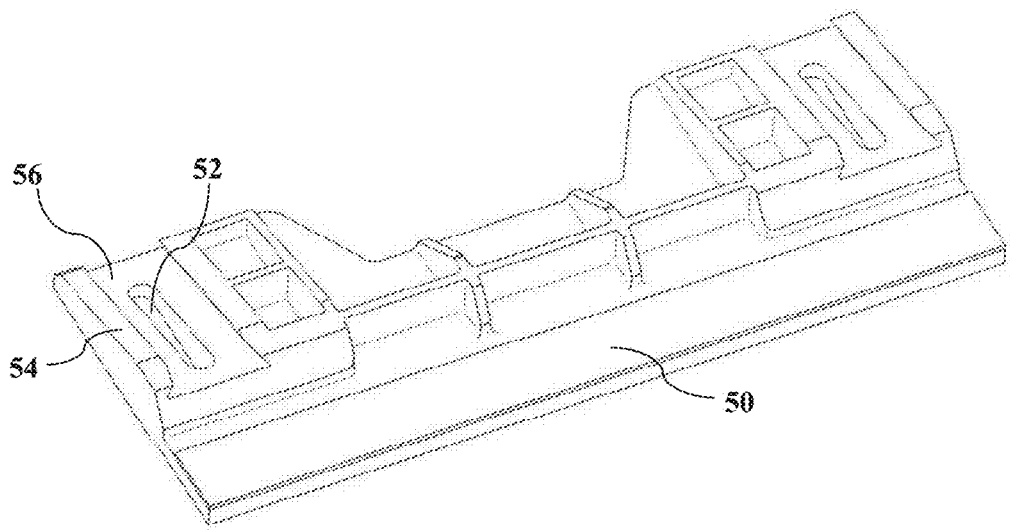
FIG. 9 is a perspective view of a rear side of a slider of the door according to the embodiment of the present invention.
Figure 10:
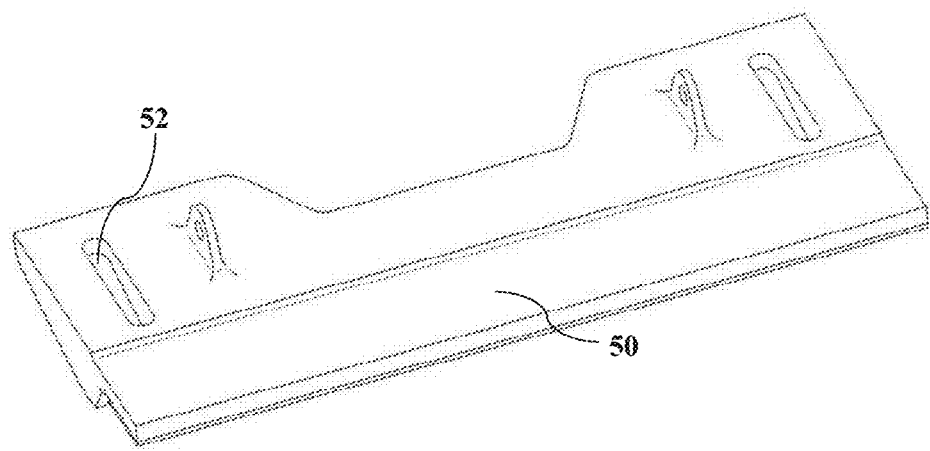
FIG. 10 is a perspective view of a front side of the slider of the door according to the embodiment of the present invention.

Preferably, a breakable feature 60 may be arranged on the body 20 of the door 10. In one example, the breakable feature 60 is a groove 60 formed in the body 20, as shown in FIGS. 2 and 7. In addition, in the example shown in FIG. 2, the breakable feature 60 may he a plurality of grooves extending in a radial direction, while in the example shown in FIG. 4, the breakable feature 60 may be a plurality of grooves extending in a circumferential direction. This is particularly advantageous in the field of aircraft. For example, in the case that the door 10 is provided for closing an access opening between an aircraft cabin and a rudder housing, when the pressure difference across the door reaches a predetermined value, the door will be automatically broken due to these breakable features so as to maintain pressure equilibrium in the cabin and the rudder housing.

Preferably, the fastener 80 is configured to fasten the slider 50 to the slider engagement portion 30 when the slider 50 is in the first position, and hold the slider 50 on the slider engagement portion 30 in such a manner as to allow the slider 50 to be slidable (that is, preassembling the slider 50 on the slider engagement portion 30) when the slider 50 is in the second position. In this way, when the opening is desired to be closed with the door, the slider 50 may rapidly and easily slide from the second position to the first position and be secured in place by the fastener.

The body 20 and the slider 50 can be made of a lightweight material such as a plastic material, while the fastener 80 and the resilient member 90 and the like can be made of metal. Thus, the entire door 10 becomes lighter and more applicable to the field of aircraft.

The mounting and demounting processes of the door 10 are now briefly described hereinafter. First, in the state that the slider 50 is preassembled on the slider engagement portion 30 of the body 20 by the fastener 80, the body 20 of the door 10 abuts against the first side 3 of the structure 1. Then, the slider 50 is slid to the first position such that a portion of the slider 50 abuts against the second side 4 of the structure 1, and then the fastener 80 is fastened to generate a predetermined tightening force. In a simpler alternative, the fastener 80 is tightened directly without sliding the slider 50 specially, and as the fastener 80 is tightened, the slider 50 will be automatically moved to the first position, achieving the fastening of the door 10 to the opening 2. Thus, the door is mounted quickly and easily. When demounting the door, it only needs to loosen the fastener 80, so that the slider 50 automatically slides to the second position under the elastic force of the resilient member 90, and thus the door 10 is released from the opening 2.

Figure 11:
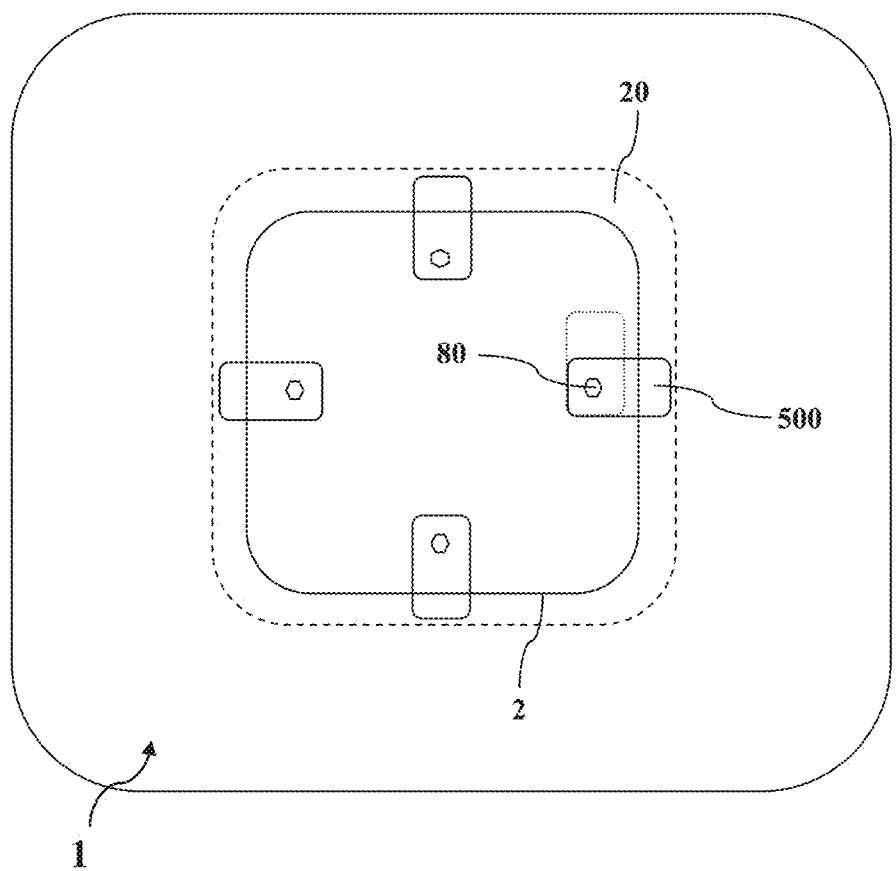
FIG. 11 is a front view of a door according to another embodiment of the present invention.

As yet another particular example for implementing the above clamping member, FIG. 11 discloses an example in which the clamping member is implemented as a rotating member 500, Taking the rotating member 500 on the left side as an example, the rotating member 500 is rotatable between the first position shown in solid lines and the second position shown in dashed lines. In the first position, the body 20 abuts against the first side of the opening 2 and the rotating member 500 abuts against the second side of the opening 2 so as to sandwich the structure 1 between the body 20 and the rotating member 500, and in the second position, the rotating member 500 is rotated such as to be fully in the range of the opening 2 to allow the door to be opened. With this embodiment, the features such as the groove and the protrusion of the slider and the slider engagement portion can be omitted. Thus, the configuration of the door is further simplified and the manufacturing cost of the door is reduced.

While various embodiments of the present invention have been described in detail herein, it should be understood that the present invention is not limited to the specific embodiments described and illustrated in detail herein. Those skilled in the art can also make other variations and modifications without departing from the principle and scope of the invention, and these variations and modifications should also be deemed to fall into the scope of the invention. Furthermore, all the elements described herein can be replaced by other technically equivalent elements.

What is claimed is:

1. A door for closing an opening in a structure, comprising: a body arranged to be capable of abutting against a first side of the opening;
at least one clamping member configured to be capable of abutting against an opposite second side of the opening, wherein the clamping member is configured to be a slider arranged on a slider arrangement portion of the body;
a fastener arranged to fasten or release the slider relative to the slider engagement portion;
wherein the slider is slidable against the slide engagement portion between a first position where the slider abuts against the second side of the opening so as to lock the door to the opening, and a second position where the slider retracts to allow the door to be opened; and,
wherein the slider is provided thereon with a first inclined surface, and the slider engagement portion is provided thereon with a corresponding second inclined surface, such that the first inclined surface of the slider is slidable against the second inclined surface of the slider engagement portion.

2. The door according to claim 1, wherein in the first position, the slider is fastened to the slider engagement portion by the fastener.

3. The door according to claim 1, wherein in the second position, the slider is held on the slider engagement portion in a slidable manner by the fastener.

4. The door according to claim 1, wherein the fastener comprises a nut member arranged on the body and a bolt member arranged to be capable of passing through a through hole in the slider and being screwed into the nut member; or
the fastener comprises a bolt member arranged on the body and capable of passing through a through hole in the slider and a nut member arranged on the side of the slider and capable of being screwed on the bolt member.

5. The door according to claim 4, wherein the through hole in the slider is an elongated hole extending along a sliding direction of the slider.

6. The door according to claim 1, wherein a resilient member is arranged between the slider and the body to pull the slider back to the second position.

7. The door according to claim 1, wherein the slider is provided thereon with a groove or a protrusion, and the slider engagement portion is provided thereon with a protrusion or a groove corresponding to the groove or the protrusion of the slider.

8. The door according to claim 7, wherein the groove in the slider or the slider engagement portion is a dovetail groove.

9. The door according to claim 1, wherein the body is connected to the structure via a connecting member.

10. The door according to claim 1, wherein a sealing member is arranged between the body and the structure.

11. The door according to claim 1, wherein the body is substantially a quadrangle with rounded corners.

12. The door according to claim 1, wherein the slider is arranged on each of four sides of the body.

13. The door according to claim 1, wherein the body of the door is provided thereon with a breakable feature.

14. The door according to claim 13, wherein the breakable feature is a groove formed in the body.

15. The door according to claim 1, wherein the structure is a skin of an aircraft.

16. The door according to claim 1, wherein an angle between the first inclined surface or the second inclined surface and a plane on which the body is located ranges from 10 degrees to 30 degrees.

17. An aircraft, comprising the door according to claim 1.

* * * * *